United States Patent
Choplin

(10) Patent No.: US 10,486,914 B2
(45) Date of Patent: Nov. 26, 2019

(54) DEVICE AND METHOD FOR FORMING BATCHES

(71) Applicant: SIDEL PACKING SOLUTIONS, Corcelles-les-Citeaux (FR)

(72) Inventor: Gregory Choplin, Corcelles les Citeaux (FR)

(73) Assignee: SIDEL PACKING SOLUTIONS, Corcelles les citeaux (FR)

( * ) Notice: Subject to any disclaimer, the term of this patent is extended or adjusted under 35 U.S.C. 154(b) by 0 days.

(21) Appl. No.: 15/741,129

(22) PCT Filed: Jun. 24, 2016

(86) PCT No.: PCT/FR2016/051553
§ 371 (c)(1),
(2) Date: Dec. 29, 2017

(87) PCT Pub. No.: WO2017/001750
PCT Pub. Date: Jan. 5, 2017

(65) Prior Publication Data
US 2018/0186579 A1 Jul. 5, 2018

(30) Foreign Application Priority Data

Jun. 30, 2015 (FR) ..................................... 15 56108

(51) Int. Cl.
*B65B 21/06* (2006.01)
*B65B 35/36* (2006.01)
(Continued)

(52) U.S. Cl.
CPC ............ *B65G 47/088* (2013.01); *B65B 21/06* (2013.01); *B65B 35/36* (2013.01); *B65B 35/405* (2013.01);
(Continued)

(58) Field of Classification Search
CPC ....... B65B 35/405; B65B 21/06; B65B 35/36; B65G 47/088; B65G 54/02
(Continued)

(56) References Cited

U.S. PATENT DOCUMENTS 5,174,430 A * 12/1992 Ebira ................... B65G 47/648
198/418.5
5,235,996 A 8/1993 Beswick
(Continued)

FOREIGN PATENT DOCUMENTS

DE  10 2012 201 059 A1  7/2013
EP  1 560 772 A1  8/2005
(Continued)

OTHER PUBLICATIONS

International Search Report, dated Sep. 27, 2016, from corresponding PCT application No. PCT/FR2016/051553.

*Primary Examiner* — Douglas A Hess

(57) ABSTRACT

Disclosed is a device for packaging products, having a packaging module in which the products are packaged in batches, notably by shrink-wrapping or case packing, and also a belt extending in a conveying direction in order to supply the module with batches of products; the device further includes a supply unit which delivers the products on the belt from a station upstream of the packaging device, the supply unit being based on a linear motor principle and extending at least partially through at least one lateral zone belonging to the packaging device, next to the belt. Also disclosed is a corresponding process.

17 Claims, 6 Drawing Sheets

(51) Int. Cl.
   *B65G 54/02* (2006.01)
   *B65G 47/08* (2006.01)
   *B65B 35/40* (2006.01)

(52) U.S. Cl.
   CPC ...... *B65G 54/02* (2013.01); *B65G 2201/0244* (2013.01)

(58) Field of Classification Search
   USPC ...... 198/418.7, 418.9, 426, 429, 442, 459.1; 53/251, 252, 448
   See application file for complete search history.

(56) References Cited

U.S. PATENT DOCUMENTS

| | | | | |
|---|---|---|---|---|
| 5,429,651 A * | 7/1995 | Bolin | ............... | B65G 47/82 198/430 |
| 6,889,485 B2 * | 5/2005 | Davaillon | ............... | B65B 21/06 198/418.7 |
| 7,104,027 B2 * | 9/2006 | Ford | ............... | B65B 5/106 53/237 |
| 7,416,072 B2 | 8/2008 | Gosset | | |
| 7,815,034 B2 * | 10/2010 | Fleck | ............... | B65G 47/088 198/418.7 |
| 7,921,983 B2 * | 4/2011 | Gimmerstam | ......... | B65B 35/44 198/418.7 |
| 8,113,335 B2 * | 2/2012 | Aronsson | ............ | B65G 47/841 198/419.2 |
| 8,596,446 B2 * | 12/2013 | Biggel | ................. | B65B 35/246 198/419.2 |
| 8,695,781 B2 * | 4/2014 | Mougin | ................ | B65G 47/82 198/426 |
| 9,045,291 B2 | 6/2015 | Konrad et al. | | |
| 9,309,015 B2 * | 4/2016 | Overley | ................ | B65B 35/30 |
| 9,365,358 B2 * | 6/2016 | Barber | ................ | B65G 47/086 |
| 9,463,888 B2 * | 10/2016 | Overley | ................ | B65B 35/30 |
| 9,764,904 B2 * | 9/2017 | Barber | ................ | B65G 47/086 |
| 2011/0168525 A1 | 7/2011 | Vasse et al. | | |
| 2015/0001041 A1 | 1/2015 | Barber et al. | | |

FOREIGN PATENT DOCUMENTS

| | | |
|---|---|---|
| EP | 2 163 498 A1 | 3/2010 |
| EP | 2 331 433 A1 | 6/2011 |
| FR | 2 847 242 A1 | 5/2004 |
| WO | 2010/037959 A1 | 4/2010 |

\* cited by examiner

DEVICE AND METHOD FOR FORMING BATCHES

This invention pertains to the field of product packaging within a chain-handling industrial line, and it has as its object, on the one hand, a particular packaging device, and, on the other hand, a method that implements this device.

In this field, the products such as flasks, bottles, or other containers, in particular those with a circular base, circulate among successive processing stations, of the filling, labeling and capping type, which make it possible to chain-manufacture the products. Once the products are finished, they pass through stations that package them in bundle form, i.e., groups of products that are coated with film that combines them into a group that is self-supporting and strong and protected for transport.

It is therefore necessary, before the coating by plastic film, to arrange the products as a matrix. In a general way, the products of the same batch are organized in lines and in columns of products that are separated and do not overlap.

To form such batches, the products, moving upstream in a bulk configuration, and therefore staggered, are separated into columns that do not overlap owing to plates that delimit longitudinal channels, as in EP2331433. Longitudinal spaces are then provided between the products to form consecutive batches on a belt in the area of which they are then coated with film. The passage into a heating chamber then has the effect of shrinking the film and then tightening the products against one another.

Relative to the creation of longitudinal product sections, EP1560772 proposes, for example, causing the products to circulate from an oblique single-line channel in relation to the last belt. U.S. Pat. No. 5,235,996 proposes an assembly that receives a cumulative stream in bulk, relying on a principle of vertical blades that can move longitudinally at the inlets of the channels. The transformation of a stream in bulk into a stream based on separated channels creates, however, wedging problems.

In the current state of the art, there is therefore a need for a solution for supplying products on a packaging machine belt, which is reliable and avoids possible wedging problems. In addition, this supplying solution is to be compatible with high operating rates of the downstream packaging module.

To do this, the invention proposes bringing the products into the area of the belt using a linear motor system, which then ensures the referencing and controlling of the products one at a time, with these products being grasped from an upstream station and brought onto a downstream belt from the side, to form batches as the belt moves along.

The invention thus has as its object a product packaging device having, on the one hand, a packaging module in which the products are packaged in batches, in particular by bundling or by case packing, and, on the other hand, a belt extending in a conveying direction to supply said module with batches of products, the device also comprising a supply means that brings the products onto the belt from a station upstream from the packaging device.

This device is characterized in that the supply means relies on a linear motor principle and extends at least partially into at least one lateral zone that the packaging device has, beside the belt.

The invention also has as its object a method that is implemented by this device, namely a supply method for a product packaging device comprising a belt that extends in a conveying direction and that supplies a packaging module with batches of products that are to be packaged, a method comprising a step consisting essentially in bringing to the belt said products from an upstream station using a linear motor principle owing to which the products are moved using shuttles.

This method is characterized in that it also comprises a step consisting essentially in placing the products on the belt from the side of the belt.

The invention will be better understood owing to the description below, which is based on possible embodiments, explained in a way that is illustrative and in no way limiting, with reference to the accompanying figures, in which.

Figure 1:
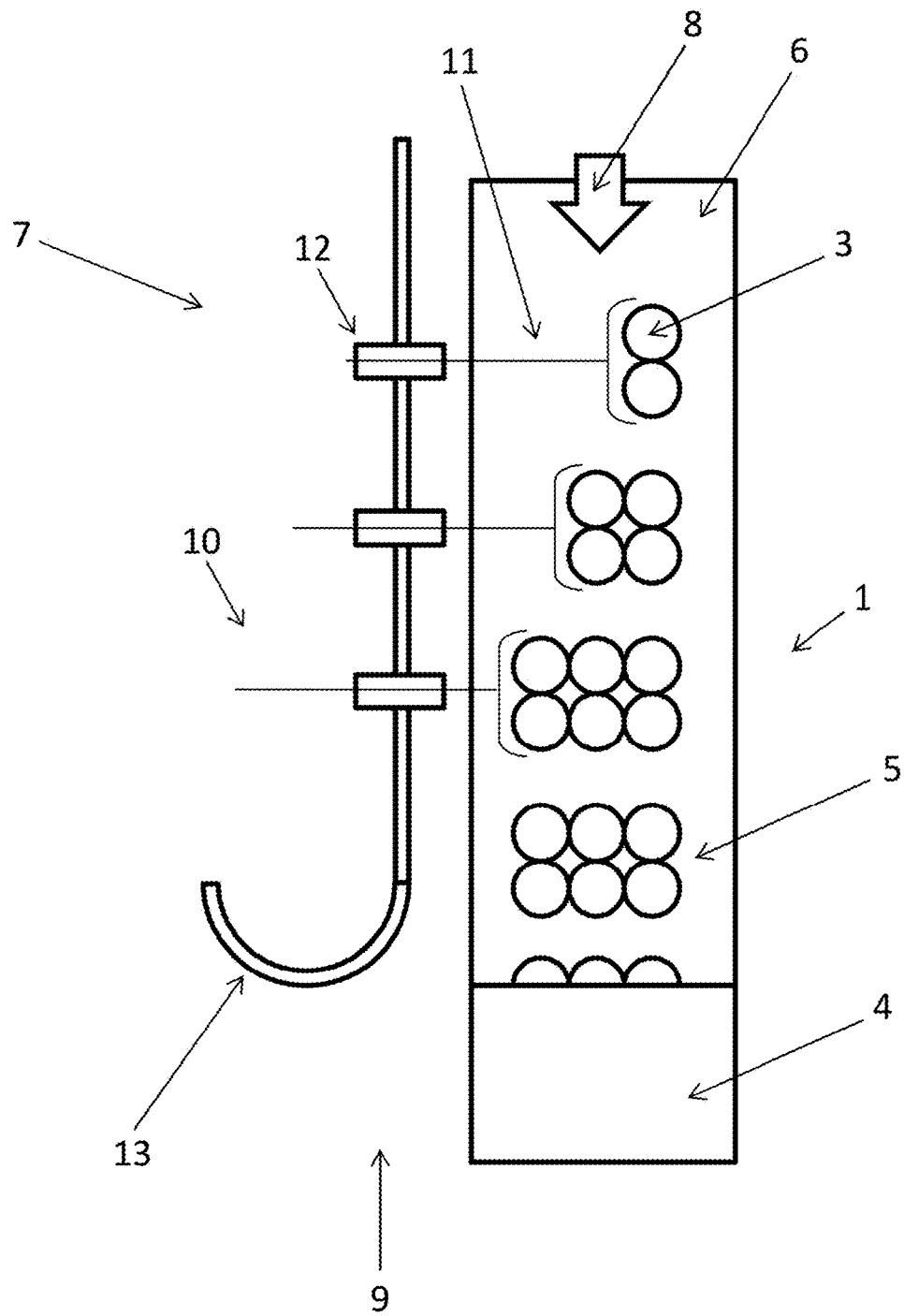
FIG. 1 shows a diagrammatic view of a supplying of a belt according to the invention.

The invention therefore first has as its object a device 1 for packaging products 3, having, on the one hand, a packaging module 4 in which the products 3 are packaged in batches 5, in particular by bundling or case packing, and, on the other hand, a belt 6 that extends in a conveying direction 8 to supply said module with batches 5 of products 3, with the device also comprising a supply means 7 that brings the products 3 onto the belt 6 from a station upstream from the packaging device 1.

The products 3 are preferably of the liquid-containing flask, bottle or other type that the packaging module 4 packs using a corresponding film to obtain a self-supported bundle, in which the products 3 are arranged by batch 5. In other applications, the products 3 in batch 5 are grasped and placed directly in a box-type container. The batches 5 are each formed by at least one row 24 that is transverse to the conveying direction 8, and at least one longitudinal column 16, in terms of the conveying direction 8. The products 3 in a batch 5 can be staggered.

The supply means 7 is used to grasp the products 3 from an upstream step for manufacturing products 3 and then to deposit them on the belt 6. The upstream manufacturing step can be terminated by a labeling or a capping of the product 3. As will be described below, the products 3 are arranged by batch 2 upon their deposition on the belt 6 by the supply means 7.

According to the invention, the supply means 7 relies on a linear motor principle and extends at least partially into at least one lateral zone 9 that the packaging device 1 exhibits, beside the belt 6.

In addition, preferably, the supply means 7, based on the at least one lateral zone 9, deposits the products 3 on said belt 6 from various parts of said zone distributed in the conveying direction 8, and the packaging device 1 also comprises at least one transfer means 10 with at least one pusher 11 that can move in the conveying direction 8 and that acts transversely to the conveying direction 8 to move the products 3 from the at least one lateral zone 9 up to the belt 6.

One of the advantages of a supply means based on a linear motor with shuttles and a rail is that the position of the products 3 is known and is referenced continuously, starting from when they are picked up in the upstream station, which makes it possible in particular to have a precise deposition on the belt 6. The linear motor of the supply means 7 therefore uses an element of the main rail type 13 on which the shuttles 12 circulate, with each shuttle 12 able to receive at least one product 3. The supply means 7 has the special feature of depositing the products 3 from the side of the belt 6, one at a time or one row 24 each time. It is thus possible to benefit from the uniform advance of the belt 6 to provide, at various stationary zones, various parts of batch 5, in particular one column 16 each time.

The main rail 13 of the supply means 7 therefore extends in the area of the upstream station where it is to grasp the products 3, as well as along the belt 6, on one side, in a lateral zone 9 from which the products 3 are transferred transversely. The products 3 are transferred on the belt 6 from various parts of the lateral zone 9 that are distributed during the movement of advance of the belt 6, in such a way that each batch 5 forms as it moves along toward the packaging module 4. The rate of formation of batch 5 is then much higher than by depositing the products 3 by transverse rows 24, in the area of the end of the belt 6.

The transfer means 10 ensures that the products 3 pass from the supply means 7 to the belt 6. Preferably, the movement of the products 3 upon transfer is, in relation to the belt 6, directed only transversely to the conveying direction 8.

In certain embodiments, the supply means 7 comprises a set of shuttles 12 that circulate on a main rail 13 and that move the products 3, and the at least one pusher 11 is independent of the shuttles 12 and acts on the products 3 to move them up to the belt 6 when the shuttles 12 have brought them into the at least one lateral zone 9. Such a pusher 11 then does not track the complete cyclic movement of the shuttles 12 and is not mounted on them. It works essentially in the lateral zone 9 and remains there. It does not accompany the shuttles 12 to the upstream post from where the products 3 are extracted.

According to a possible additional characteristic, the at least one transfer means 10 comprises a set of slides 14 that are transverse to the conveying direction 8, movable in said direction and on which the pushers 11 are mounted. The pushers 11 can therefore be moved transversely to the conveying direction 8 owing to linear slides 14 and can make possible a movement that is perpendicular to the conveying direction 8, with these slides 14 themselves preferably being movable in the conveying direction 8, in such a way as to follow the movement of the belt 6. In relation to a stationary frame, the slide 14 therefore moves in the conveying direction 6 during the transfer of the products 3 from the shuttles 12 to the belt 6. The slides 14 are then brought back into the initial position for the transfer of the next products 3. The slides 14 are thus driven by a cyclic back-and-forth movement in the conveying direction 8. The pushers 11, on the slides 14, move, in relation to the belt 6, transversely to the conveying direction 8.

According to another possible characteristic, the at least one transfer means 10 relies on a linear motor principle and comprises a secondary rail 15 in the at least one lateral zone 9, on which the pushers 11 are mounted to move. In these embodiments, the pushers 11 are therefore moved by a linear motor principle, optionally superposed on the main rail 13 of the linear motor of the supply means 7 that brings the products 3 into the area of the belt 6. One of the advantages is then that the secondary rail 15 has a closed loop shape and that the return of a pusher 11 into the initial position is done without interfering with the function of transfer from the shuttles 12 to the belt 6. It is also possible to provide a large number of pushers 11, some of them then optionally being on stand-by.

In other embodiments, the supply means 7 comprises a set of shuttles 12 that circulate on a main rail 13 and that move the products 3, with the at least one transfer means 10 being mounted on said shuttles 12, in the form of one pusher 11 per shuttle 12. Having to add a supplementary system for the transfer means 10, with a stationary structure in relation to the frame, is thus avoided. Although the structure of the shuttles 12 is then more elaborate and complex, the synchronization of the travel speeds between the belt 6, the shuttles 12 and the pushers 11 is simpler.

According to another possible additional characteristic, the supply means 7 extends in the area of two lateral zones 9 that the packaging device 1 has, positioned, on the one hand, on one side of the belt 6, and, on the other hand, on the other side, in such a way as to supply the products 3 on the belt 6 from each of its two longitudinal sides. This is particularly compatible with the situations where the batches 5 are arranged in several longitudinal lines on the belt 6. Batches 5 are formed from one side of the belt 6 and from the other side, thus leading to two parallel lines that advance toward the packaging module 4. In a general way, this operation can also be implemented from lateral zones 9 that are on the same side.

The invention also has as its object a method that uses the device as described above, namely a supply method for a device 1 for packaging products 3 comprising a belt 6 that extends in a conveying direction 8 and that supplies a module 4 for packaging in batches 5 products 3 to be packaged, method that comprises a step that consists essentially in bringing to the belt 6 said products 3 from an upstream station using a linear motor principle owing to which the products 3 are moved using shuttles 12. The supply means 7 ensures this step for intake of products 3.

According to the invention, the method also comprises a step that consists essentially in depositing the products 3 on the belt 6 from the side of the belt 6.

Preferably, the deposition of products 3 on the belt 6 is done from various locations distributed longitudinally on the side of the belt 6, for contributing simultaneously to form multiple batches 5 each time from said locations.

The transfer means 10 ensures this deposition step. The first products 3 that are deposited from the batch 5 are then those that are the furthest away from the lateral zone 9, with the latter being those that are the closest. The closer products 3 of the lateral zone 9, transversely to the conveying direction 8, are deposited from parts of said lateral zones 9 that are further downstream in terms of the conveying direction 8. One batch is therefore formed gradually, while the belt 6 moves it along the lateral zone 8 to the packaging module 4.

According to a possible additional characteristic, the deposition of the products 3 on the belt 6 follows the movement of said belt 6 in the conveying direction 8, in such a way that the products 3, in relation to the belt 6, undergo only a transverse movement in the conveying direction 8. Thus, drops of products 3 are prevented. The pushers 11, the belt 6 and the products 3 therefore all have, in relation to a frame, the same speed in the conveying direction 8.

According to another possible additional characteristic, multiple products 3 that are aligned in the conveying direction 8 are deposited on the belt 6 in a single deposition operation, in particular the number of products 3 that form a column 16 of a batch 5 in the conveying direction 8. The batches 5 are therefore formed by virtue of the fact that their constituent columns 16 are received in succession during their movement owing to the belt 6.

Finally, according to another possible additional characteristic, the packaging module 4 handles the products 3 in the form of batch 5 of products 3 arranged in columns 16 in the conveying direction 8 and in transverse rows 24, with the products 3 of the same column 16 being deposited simultaneously and the columns 16 of the same batch 5 being deposited one after the next, each time from another location that is further downstream.

FIG. 1 illustrates a possible cycle of the forming of three batches 5. In this figure, the products 3 circulate from top to bottom, toward the packaging module 4. The supply means 7 uses a linear motor principle, driving the shuttles 12 magnetically, equipped, on the one hand, with a main rail 13 that extends in particular against the supply belt 6, at its height, and, on the other hand, a set of shuttles 12 that circulate on said rail. The products 3 are each mounted on a shuttle 12. The products 3 are then moved in translation on the belt 6, transversely to the conveying direction 8 using the transfer means 10 based on pushers 11, from a zone where the main rail 13 extends against the belt 6 parallel to the conveying direction 8.

The batches 5 that are handled in this illustrative example consist of two products 3 in the conveying direction 8 and three products transverse to this direction. A batch 5 contains three longitudinal columns 16 of two products 3 each, or else two transverse rows 24 of three products 3 each. The supply means 7 simultaneously contributes to the formation of three batches 5, since it deposits, from various locations distributed in the conveying direction 8, products 3 that form different columns 16 each time. Each column 16 of a batch 5 is normally deposited from a different location, to increase the number of batches 5 that are formed in each cycle.

In the example of FIG. 1, the lateral zone 9 can be considered as essentially consisting of three different portions, each associated with a column 16 of products 3 that are to be deposited. The portion that is the furthest upstream in relation to the flow, and therefore higher in FIG. 1, is devoted to the deposition of the column 16 of products 3 in the batch 5 that is the furthest from the main rail 13, or column of row "one." A pusher 11 that is supposed to bring the products 3 to this position therefore moves with the greatest amplitude in relation to the next ones. The next portion in the direction of the flow is devoted to the deposition of the next column 16, or column of row "two." The next deposition portion is devoted to the deposition of the next column 16, or column of row "three." A batch 5 is therefore formed gradually, in the course of its advance under the action of the belt 6.

It is also understood that by supplying the products 3 from the side of the belt 6, the supply means 7 contributes continuously to the simultaneous formation of multiple batches 5, with each batch 5 being supplemented gradually in the course of its movement by the belt 6, with products 3 that are brought from various locations that are distributed in the course of the advance of the belt 6. In the case of FIG. 1, the supply means 7 simultaneously handles three batches 5, by providing—during the same cycle and optionally simultaneously—the column 16 of row "one" from the portion that is the furthest upstream, the column 16 of row "two" from a lateral portion that is further downstream, and the column 16 of row "three" from the portion that is the furthest downstream.

In a general way, the various elements that constitute each batch 5 are provided from various locations that are distributed in the conveying direction 8, which makes it possible with the supply means 7 to handle several batches 5 in parallel to various stages and thus to reduce the cycle time between two batches 5.

The products 3 are thus entrained one at a time in the way that is referenced, and therefore with a position that is known continuously, from the upstream station that delivers the products 3 to the belt 6 of the packaging device 1. The supply means 7 uses shuttles 12 circulating on a main rail 13 for accommodating the products 3 in the area of the upstream station and bringing them to said belt 6. To be transferred to the surface of the belt 6 that will continue their advance to the packaging module 4, the supply means 7 is also equipped with a transfer means 10, which will push the products away from the shuttles 12 and up to the belt 6. Of course, a shuttle 12 can be designed for accommodating one or more products 3.

Figure 5:
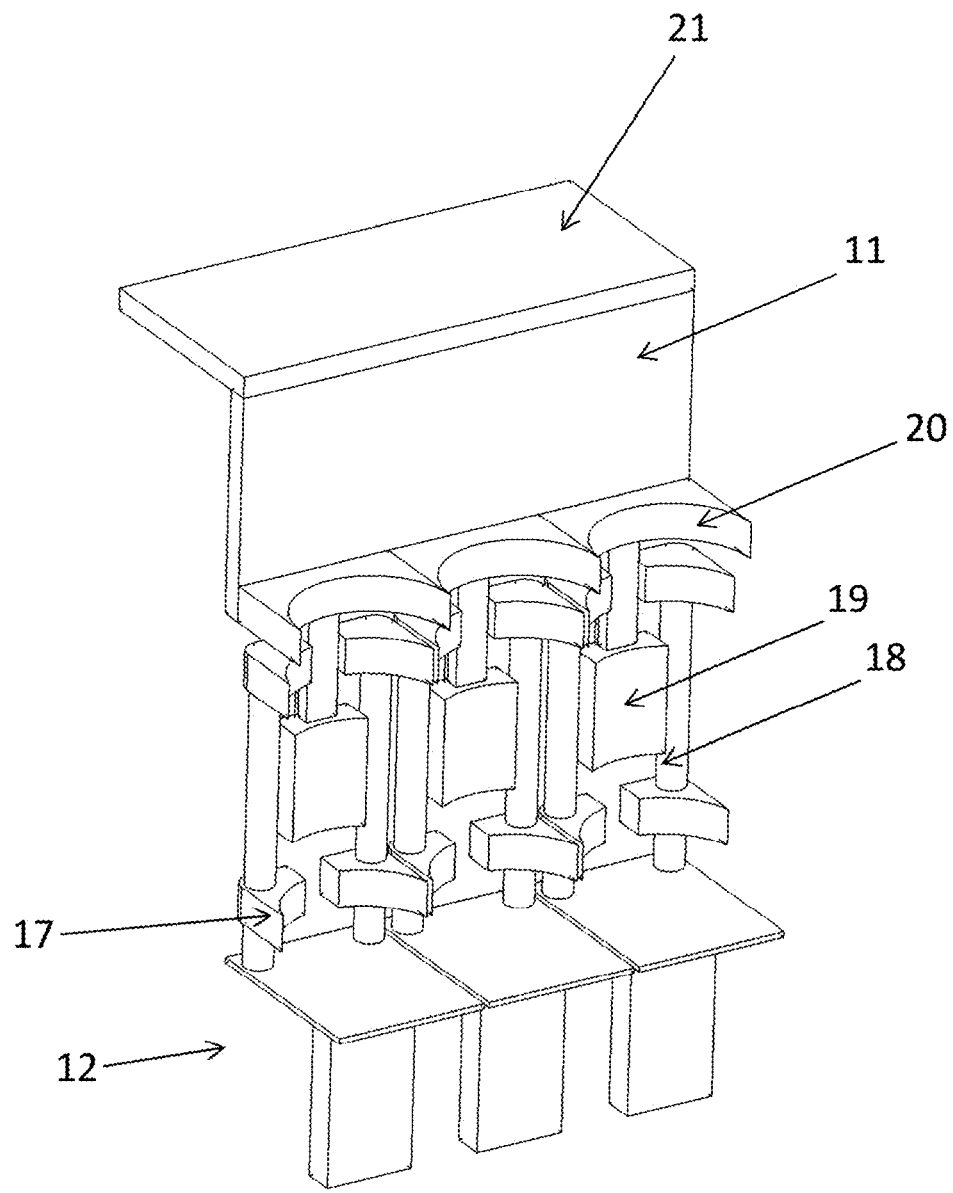

FIG. 5 shows a possible configuration for cooperation between the transfer means 10 and the shuttles 12. Each shuttle 12 is thus preferably provided with a shape that is complementary to that of the products 3, to be able to take them along the main rail 13, in a stable way. FIG. 5 shows, for example, that the shuttle receives a product 3 in the area of a flat receiving surface with which it is provided and which is essentially parallel to the surface of the belt 6 and in the same area. The shuttle 12 also has two stop means, with said means being spaced vertically by a distance that is compatible with good holding of the products 3, where each means has two guides 17 opposite it, in the direction in which the main rail 13 extends. The product 3 is therefore held in the shuttle 12 using these four guides 17, in a shape that is complementary to the outside contour of the product 3 and distributed, on the one hand, vertically, and, on the other hand, to the front and to the rear of the product 3 to be entrained. The two guides 17 of the same side of the product 3 are mounted on a column 18. A structure with two separate columns 18, each bearing one of the guides 17 of one of the stop means, is thus obtained.

A pusher 11 of the transfer means 10 can then easily circulate between these two columns 18. As FIG. 5 shows, the pusher 11 can then have a foot 19 that is designed to act between the two stop means, and is initially between the two columns 18. The pusher 11 also comprises, for each product 3 that is to be transferred, a counter-neck 20 that acts on an upper part of the product 3. Under the action of the pusher 11, the product 3 is then moved toward the belt 6, transversely to the conveying direction 8, under the action, on the one hand, of a foot 19 and a counter-neck 20. The capacities, in terms of product 3, pusher 11, on the one hand, and shuttles 12, on the other hand, can be different, single or multiple. For example, the pusher 11 can transfer several products 3 simultaneously, whereas the shuttle 12 can move only a single product 3 each time. It is then necessary to position some shuttles 12 conveying the products 3 that will be handled by the same pusher 11 in relation to other shuttles. This configuration is illustrated, for example, in FIG. 5. In a general way, the shuttle 12 conveys at least one product 3; the pusher 11 transfers at least one product 3, with the shuttle 12 and the pusher 11 able to handle a different number of products 3.

In addition, in a general way, for the holding of the product 3, the shuttles 12 have a shape that is complementary enough to the product 3 to hold it and entrain it, and the number and the position of the means of stops or corresponding guides can be different from one embodiment to the next. The associated pusher 11 has, however, a shape that is complementary to the shuttle 12 so that the product 3 is successively in contact with the shuttle 12 and then the pusher 11.

The transfer means 10 then ensures the movement of the products 3 from the lateral zone 9 and up to the belt 6, transversely to the conveying direction 8. The transfer means 10 therefore pushes the products 3 so that they leave the shuttles 12 and are received on the belt 6 to form a batch 5 and to continue to the packaging module 4.

Preferably, during the passage from the shuttles 12 to the belt 6, the products 3 undergo, in relation to the belt 6, a movement that is perpendicular to the conveying direction 8. The shuttle 12, at least when the at least one product 3 pushed by the transfer means 10, therefore has a speed, in the conveying direction 8, that is the same as that of the belt 6, in relation to a stationary point. The speed of the shuttles 12 before or after the deposition of the products 3 can, of course, be different, with the shuttles 12 therefore able to be movable in relation to one another. In ensuring a positional tracking between, on the one hand, the shuttle 12 that brings at least one product 3 into the lateral zone 9 and, on the other hand, the belt 6, the risks of products 3 falling during the passage from one to the other are limited. The packaging device 1 is thus preferably equipped with a control unit that manages, in a coordinated way, the movement of the shuttles 12 and the movement of the belt 6.

In addition, to ensure good transfer, the receiving surfaces of the shuttles 12 are preferably at the same height as the belt 6, and the space between these two elements is minimal, or even zero.

The transfer means 10 can be made in various ways. Thus, in the first variants, the transfer means 10 is mounted on the shuttles 12 directly. Each shuttle 12 is then equipped with a pusher 11 that acts to offset the at least one product 3 that is conveyed by the shuttle 12 from its receiving surface up to the belt 6. After the transfer, the pusher 11 is retracted again, so that the shuttle 12 can receive a product 3 for the next cycle. The shuttle 12, which will seek the products 3 in the area of the upstream station, therefore itself takes on board an actuator that acts on the at least one product 3 that is recovered by said shuttle 12.

This type of embodiment offers the advantage of requiring the installation of only a single circuit based on a linear motor and therefore also a single control for ensuring the pick-up of products 3 upstream, their movement toward the belt 6, and then the transfer to the belt 6.

Moreover, so as to reduce the cost that is associated with a large number of shuttles 12, with each taking on board a pusher 11, it is feasible to carry out the transfer function with a transfer means 10 that is independent of the shuttles 12. Such a transfer means 10 will therefore follow the movement of the shuttles 12, when they are found in the lateral zone 9, to act on the products 3 that they transport. The shuttles 12 are thus devoted to recovering the products 3 in the upstream station and bringing them into the lateral zone 9, in the area of the various portions of said zone from which the products 3 are pushed onto the belt 6 transversely to the conveying direction 8, whereas an additional transfer means 10, also moving at least in the lateral zone 9, is devoted to the transfer of products 3 from the shuttles 12 up to the belt 6, in the desired position.

Such a transfer means 10 is found, in relation to the belt 6, on the same side as the lateral zone 9, which makes it possible in particular to avoid interfering with the products 3 that are already deposited on the belt 6.

The transfer means 10 then comprises movable pushers 11 that follow the movement of shuttles 12 in the lateral zone 9. The pushers 11 of the transfer means 10 therefore follow the movement of advance of the belt 6 in the conveying direction 8, and the same optionally holds true for the shuttles 12. At least the pushers 11 of the transfer means 10 follow the movement of the belt 6.

Figure 2:
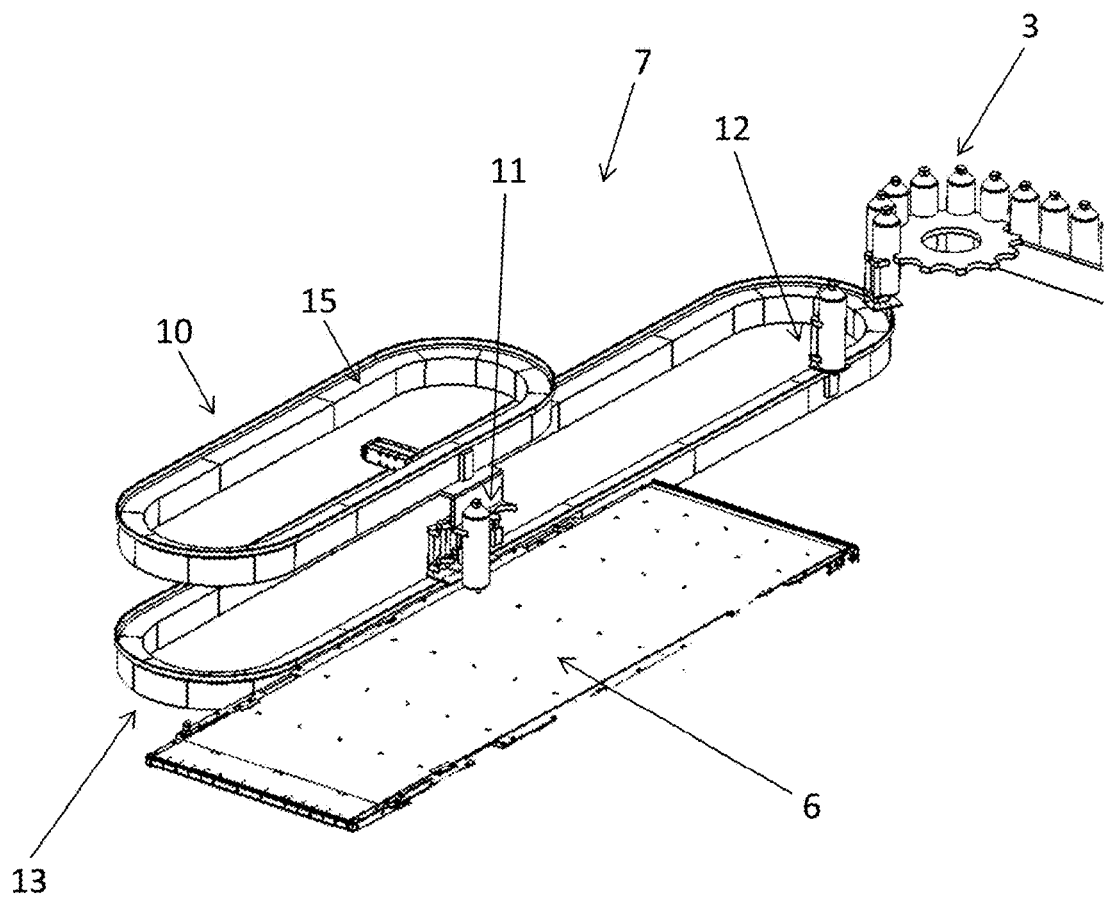
FIG. 2 shows an embodiment where the products are transferred to the belt owing to a transfer means in the form of a linear motor.

FIG. 2 shows a possible embodiment of a transfer means 10, which itself also relies on a linear motor principle. This transfer means 10 then has, on the one hand, a secondary rail 15, moving at least in part into the lateral zone 9, and, on the other hand, at least one carriage 21 that takes on board at least one pusher 11. Taking into account the complementarity of shapes between, on the one hand, the pusher 11, and, on the other hand, the shuttle 12, the carriage 21 and the shuttle 12 from which it will push the products 3 have a speed that is at least momentarily equal.

The carriage 21 thus takes on board a cylinder-type actuator 22, which will push a stop plate to pass the product 3 from the shuttle 12 up to the belt 6. The shuttle 12 actually has an open configuration on the side of the belt 6 when it is opposite it and will present this same side during the harvesting of products 3 in the upstream station.

The actuator 22 is therefore retracted before the carriage 21 that carries it arrives in the area of the shuttle 12 from which it must release the at least one product 3. When the two are opposite it, the actuator 22 goes into operation and extends, to push the products 3 transversely onto the belt 6, and then it is retracted again. The carriage 21 can then come back into position either by continuing its movement along a secondary rail in a closed loop or by reversing direction. Another option is that the same carriage 21 ensures the transfer of products 3 toward the belt 6 from several portions of the lateral zone 9 that are distributed in the conveying direction 8. For example, the carriage 21 can transfer products 3 to form a column 16 of one row, and then can be positioned downstream and wait for the shuttle 12 bringing the products 3 forming the column 16 of the next row, etc.

In simpler embodiments, another option is to put in a secondary rail 15 that itself has a pick-up that is transverse to the conveying direction 8 in order to generate the movement of the products 3 in the direction of the belt 6.

Figure 3:
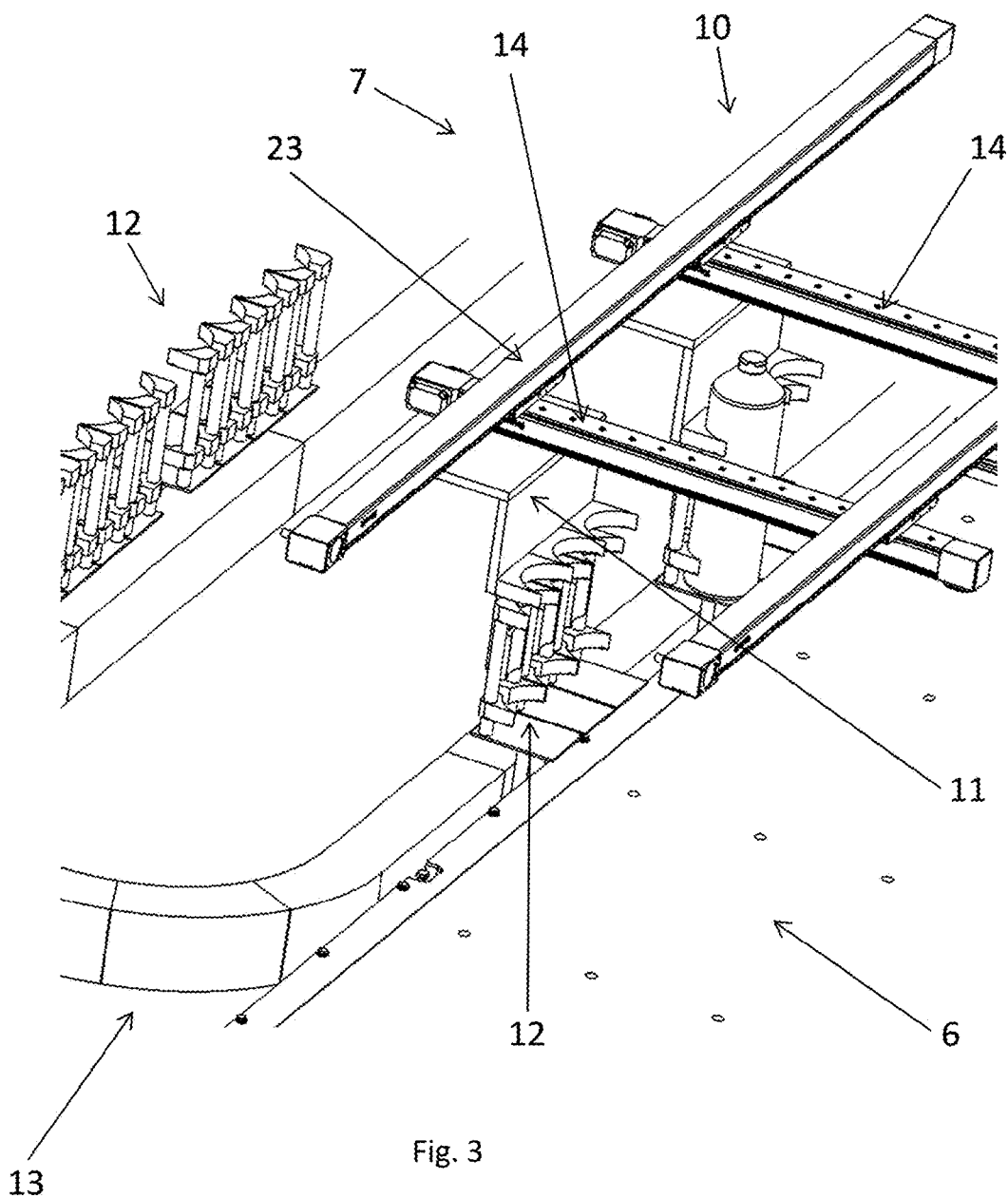
FIG. 3 shows another embodiment where the transfer means takes the form of slide-mounted pushers.
Figure 4:
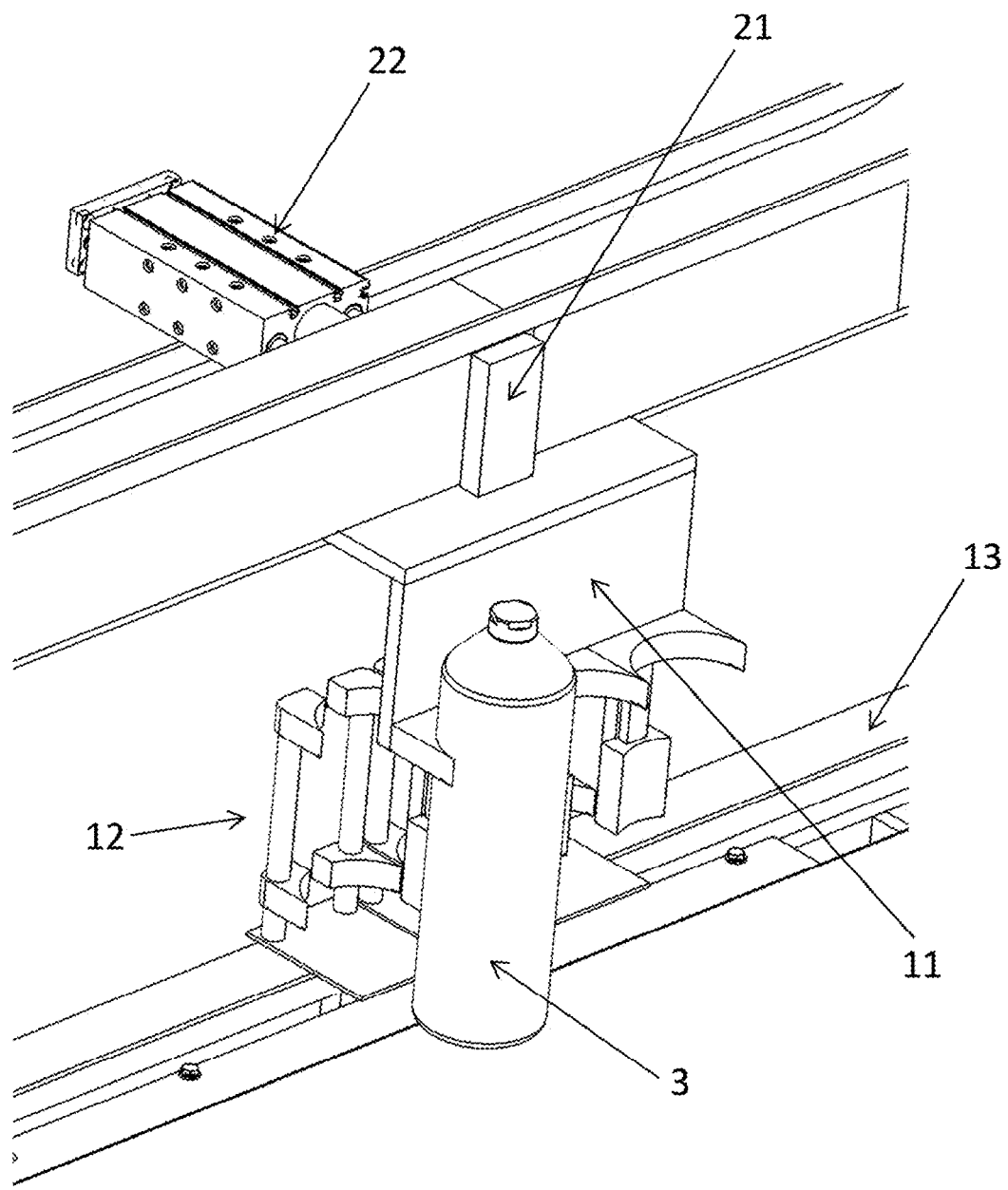
FIGS. 4 and 5 show a detailed view of cooperation and assembly between the movement shuttle and a pusher.

FIG. 3 shows another embodiment of the transfer means 10 in which the pushers 11 take the shape of movable elements that are mounted on slides 14 that make possible for them a movement that is transverse to the conveying direction 8. It is therefore the circulation of these movable elements along the slides 14 that causes the transfer of products 3 from the shuttle 12 up to the belt 6.

To ensure the positional tracking of these pushers 11 in relation to the belt 6, the slides 14 are movable in the conveying direction 8, owing to a frame 23 that extends in said direction and that also forms a slide. The frame 23 is stationary and therefore makes it possible for the slides 14 to move in the conveying direction 8, in particular at the same speed as the belt 6. It is then the movement of the pushers 11 along the slides 14 that ensures the transfer of the products 3 from the shuttles 12 up to the belt 6.

Figure 6:
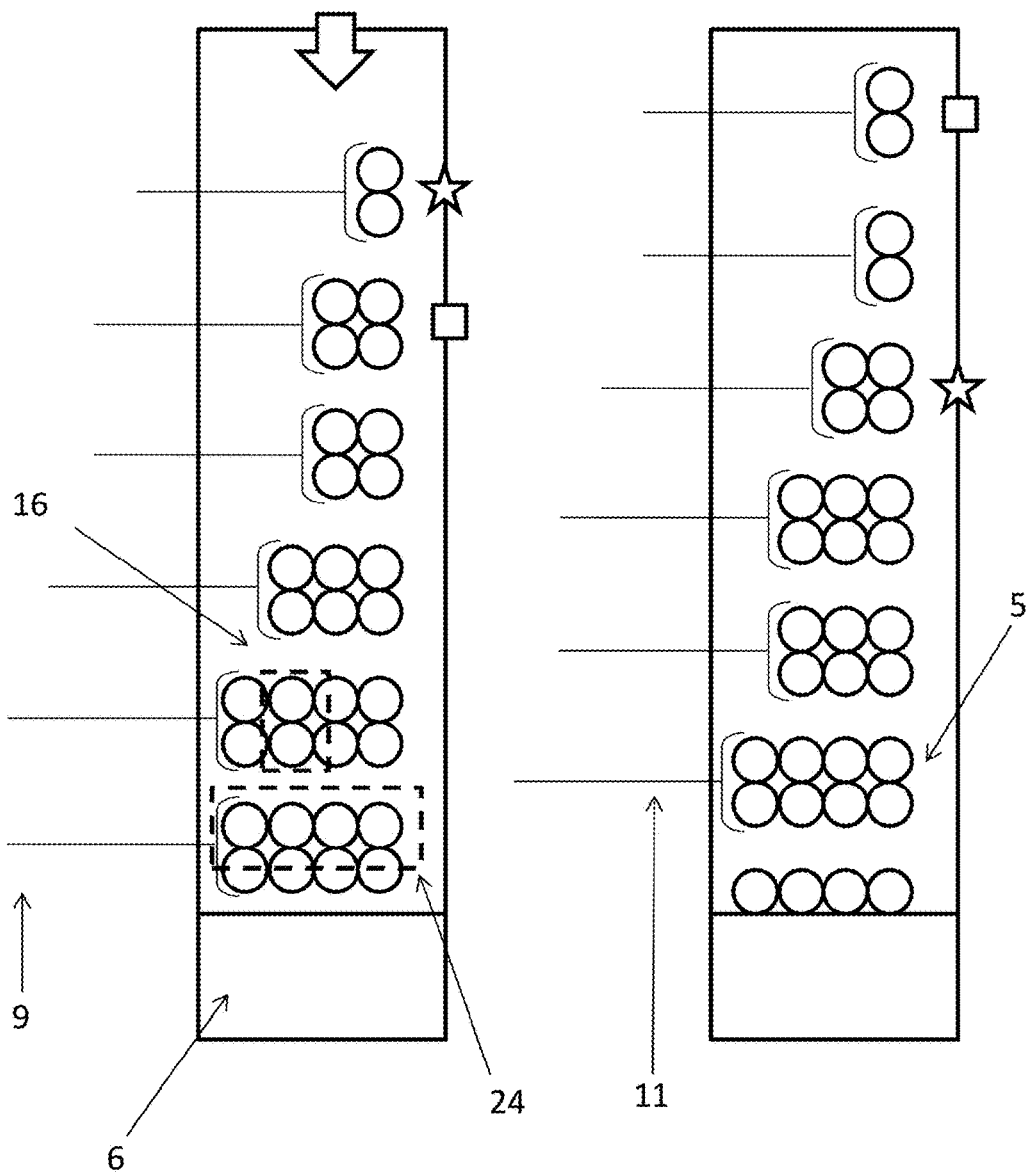
FIG. 6 shows a diagram of a particular deposition cycle.

FIG. 6 illustrates a particular cycle for creation of a set of batches 5. The configuration that is shown in the left diagram precedes that of the right, with the star-shaped reference showing the progression of the belt 6 between the two. The configuration that is shown in the right diagram therefore also precedes that of the left, with the square-shaped reference showing the progression of the belt 6 between them. In the left configuration, a column 16 of product 3 is provided for row "one," for the batch 5 that is the furthest upstream, for row "two" of the next two batches 5, and then for the next row in each of the two downstream batches 5. Two batches 5 are thus each supplemented with a column 16 of the same row, namely row "two" for the second and third batches 5.

In the next step, to the right of FIG. 6, these are the first batch 5 and the second batch 5 that receive the column 16 of the same row, namely that of row "one," as well as the fourth and fifth batches 5 that in their turn receive the column 16 of row "three." These two batches 5 have actually each received, during the preceding deposition cycle, a column 16 of row "two." The other batches 5 each receive the column 16 of the first missing row in the direction of the lateral zone 9.

In a general way, the supply means 7 therefore organizes in a cyclic way the simultaneous development of a group of batches 6 from a lateral zone 9, with a different part of the batch 6, column 16 preferably, but optionally also row 24, being provided each time from a different part of the lateral zone 9, with said parts being distributed in the conveying direction 8. By so doing, various batches 6, at various stages of completion, can be handled simultaneously from various parts of lateral zone 9.

To improve the operating pace, this principle can be reproduced at several locations of the belt 6, in such a way that the latter is supplied with products 3 from several lateral zones 9 along the belt, from which, for each one, several batches 5 are manufactured in parallel. For example, in advantageous embodiments, the supply means 7 provides the products 3 from the two sides of the belt 6 simultaneously. Thus, the main rail 13 extends into a zone that is located on one side of the belt 6, the same rail or another rail extending from the other side. The belt 6 then receives the products 3 that will form the batches 5 from two lateral zones 9 that are separated by the belt 6, opposite one another.

The supply means 7 therefore brings—during a deposition cycle—products 3 that are intended for various batches 5 each at various stages, and this from various locations through which the belt 6 successively passes.

Owing to the invention, it is thus possible to bring products onto a packaging machine belt in a reliable and sure way, while adhering to a high deposition rate.

Although the description above is based on particular embodiments, it is in no way limiting of the scope of the invention, and modifications can be provided, in particular by substituting equivalent techniques or by a different combination of all or part of the characteristics developed above.

The invention claimed is:

1. Device for packaging (1) products (3) comprising:
a packaging module (4) in which the products (3) are packaged in batches (5), in particular by bundling or by case packing,
a belt (6) extending in a conveying direction (8) to supply said packaging module with batches (5) of products (3), and
a supply means (7) that brings the products (3) onto the belt (6) from a station upstream from the packaging device (1), starting from the at least one lateral zone (9), deposits the products (3) on said belt (6) from various parts of said zone that are distributed in the conveying direction (8), wherein:
the supply means (7) relies on a linear motor principle and extends at least partially into at least one lateral zone (9) that the packaging device (1) has, beside the belt (6), and
the supply means (7) comprises a set of shuttles (12) that circulate on a main rail (13) and that move the products (3), and the at least one pusher (11) is independent of the shuttles (12) and acts on the products (3) to move them up to the belt (6) when the shuttles (12) have brought them into the at least one lateral zone (9).

2. Device according to claim 1, wherein the supply means (7) comprises a set of shuttles (12) that circulate on a main rail (13) and that move the products (3), and the at least one pusher (11) is independent of the shuttles (12) and acts on the products (3) to move them up to the belt (6) when the shuttles (12) have brought them into the at least one lateral zone (9).

3. Device according to claim 1, further comprising at least one transfer means (10) being mounted on said shuttles (12), in the form of one pusher (11) per shuttle (12).

4. Device according to claim 1, wherein the supply means (7) extends in the area of two lateral zones (9) that the packaging device (1) has, one zone positioned on one side of the belt (6), and the other zone on the other side.

5. Device according to claim 1, further comprising at least one transfer means (10) with at least one pusher (11) that can move in the conveying direction (8) and that acts transversely to the conveying direction (8) to move the products (3) from the at least one lateral zone (9) up to the belt (6).

6. Device according to claim 1, wherein the supply means (7) extends in the area of two lateral zones (9) that the packaging device (1) has, one zone positioned on one side of the belt (6), and the other zone on the other side.

7. Device according to claim 1, wherein the supply means (7) extends in the area of two lateral zones (9) that the packaging device (1) has, one zone positioned on one side of the belt (6), and the other zone on the other side.

8. Supply method for a device (1) for packaging products (3) comprising:
extending in a conveying direction (8) a belt (6);
supplying a module (4) for packaging in batches (5) products (3) that are to be packaged from at least one lateral zone (9),
bringing up to the belt (6) said products (3) from an upstream station using a linear motor principle owing to which the products (3) are moved using shuttles (12) that circulate on a main rail (13) and that move the products (3), and at least one pusher (11) is independent of the shuttles (12) and acts on the products (3) to move them up to the belt (6) when the shuttles (12) have brought them into the at least one lateral zone (9), and
depositing the products (3) on the belt (6) from the side of the belt (6) from various parts of said zone that are distributed in the conveying direction (8).

9. Method according to claim 8, wherein the deposition of products (3) on the belt (6) is done from various locations distributed longitudinally on the side of the belt (6) to contribute simultaneously in order to form several batches (5) each time from said locations.

10. Method according to claim 8, wherein the deposition of products (3) on the belt (6) tracks the movement of said belt (6) in the conveying direction (8).

11. Method according to claim 8, wherein several products (3) that are aligned in the conveying direction (8) are deposited on the belt (6) in a single deposition operation.

12. Method according to claim 8, wherein the packaging module (4) handles the products (3) in the form of a batch (5) of products (3) that are arranged in columns (16) in the conveying direction (8) and in transverse rows (24), with the products (3) of the same column (16) being deposited simultaneously and the columns (16) of the same batch (5) being deposited one after the other, each time from another location that is further downstream.

13. Device for packaging (1) products (3) comprising:
- a packaging module (4) in which the products (3) are packaged in batches (5), in particular by bundling or by case packing,
- a belt (6) extending in a conveying direction (8) to supply said packaging module with batches (5) of products (3),
- a supply means (7) that brings the products (3) onto the belt (6) from a station upstream from the packaging device (1), wherein the supply means (7) relies on a linear motor principle and extends at least partially into at least one lateral zone (9) that the packaging device (1) has, beside the belt (6), and
- at least one transfer means (10) with at least one pusher (11) that can move in the conveying direction (8) and that acts transversely to the conveying direction (8) to move the products (3) from the at least one lateral zone (9) up to the belt (6), wherein the at least one transfer means (10) relies on a linear motor principle and comprises a secondary rail (15) in the at least one lateral zone (9), on which the pushers (11) are mounted to move.

14. Device according to claim 13, wherein the at least one transfer means (10) comprises a set of slides (14) that are transverse to the conveying direction (8), movable in said direction and on which the pushers (11) are mounted.

15. Device according to claim 13, wherein the supply means (7) comprises a set of shuttles (12) that circulate on a main rail (13) and that move the products (3), and the at least one pusher (11) is independent of the shuttles (12) and acts on the products (3) to move them up to the belt (6) when the shuttles (12) have brought them into the at least one lateral zone (9).

16. Device according to claim 15, wherein the at least one transfer means (10) is mounted on said shuttles (12), in the form of one pusher (11) per shuttle (12).

17. Device according to claim 13, wherein the supply means (7) extends in the area of two lateral zones (9) that the packaging device (1) has, one zone positioned on one side of the belt (6), and the other zone on the other side.

* * * * *